Jan. 14, 1969   A. L. HUBBARD   3,421,247
FISHING ROD
Filed May 12, 1967
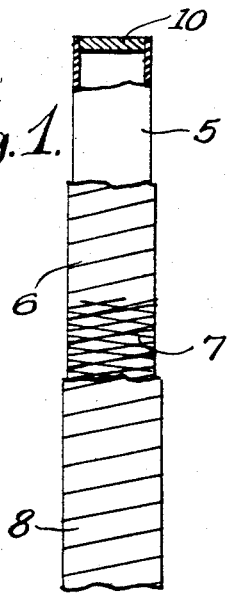
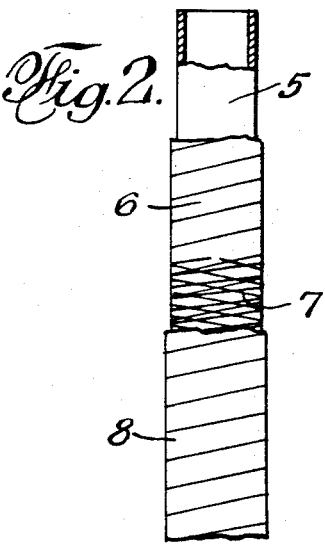
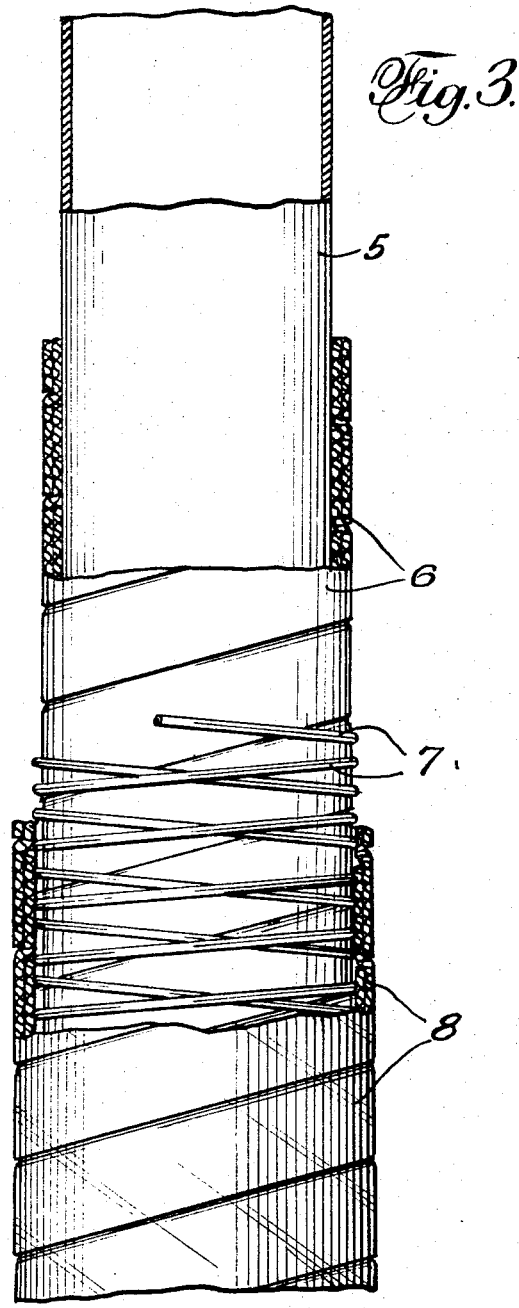
INVENTOR.
ALBERT L. HUBBARD
BY
ATTORNEY

United States Patent Office 3,421,247
Patented Jan. 14, 1969

3,421,247
FISHING ROD
Albert L. Hubbard, 677 E. Channel Islands Blvd.,
Oxnard, Calif. 93030
Filed May 12, 1967, Ser. No. 638,088
U.S. Cl. 43—18         8 Claims
Int. Cl. A01k 87/00

ABSTRACT OF THE DISCLOSURE

A fishing rod having a preferably elastic hollow core filled with fluid—liquid or gas—under pressure, loosely wrapped with steel wire, either wound with spaced coils in opposite directions or interwoven in basket-weave fashion, and encased in resin-impregnated overlapped convolutions of fiber glass tape, and heated to set the resin and provide a homogeneous coating over the core that is strengthened by the wire windings.

BACKGROUND OF THE INVENTION

My invention is directed to fishing apparatus and more directly to a fishing rod for handling a fishing line.

Prior art fishing rods, such as Patent Nos. 1,318,421 and 2,571,717, are based on solid cores or shafts, and do not contemplate the provision of a strong, elastic and collapse-proof rod, whether or not tapered, as hereinafter more fully described.

SUMMARY OF THE INVENTION

The present fishing rod comprises, in one preferred form, an elastic, hollow core 5, an inner wrapping of fabric 6 that is in tape form for spiral overlapped winding thereof, open-wound steel wire 7 wrapped over the fabric wrapping, an outer wrapping of fabric 8, and an application of resin coating said outer wrapping as well as permeating or impregnating both fabric wrappings. In a second form, the inner wrapping 6 may be omitted. In a third form, whether only the outer or both inner and outer wrappings are used, the interior of the core 5 may be placed under pressure by filling the same with pressurized fluid—either liquid, gas or air.

BRIEF DESCRIPTION OF THE DRAWING

In the drawing, like reference characters designate similar parts in the several views.

FIG. 1 is a side view, partly in section, of a portion of a fishing rod according to one embodiment of the invention.

FIG. 2 is a side view, partly in section, of another embodiment.

FIG. 3 is an enlarged view, partly in elevation and partly in section, of either of the above embodiments.

DESCRIPTION OF THE PREFERRED EMBODIMENTS

The hollow core 5 may comprise an elastic tube of plastic material. Such material may be any of the long-chain polymers, as nylon, acylate resins, polyethylene, or the various proprietary materials, as Orlon, for instance, that may have tough yet elastic properties and capable of being molded into tubular shape, either cylindrical or of tapered form. Thus, if the core 5 is to have an interior hollow that is not pressurized, the material thereof may be defined as a long-chain polymer resin.

Said core 5 may be formed as an elongated tubular bladder of a flexible material, as natural or synthetic rubber, in which case, the ends of the tube may be sealed or plugged, as at 10 (FIG. 1), and the interior of this enclosed tube may be pressurized by filling the same with a liquid, as water, or with gas or air, under pressure which, for instance, may be at fifty to one hundred p.s.i., or at a pressure that provides the tube with elasticity and yet inhibits collapse thereof under exaggerated bends.

As mentioned, the core 5 may be tapered or, if desired, partly cylindrical and partly tapered, in the manner of fishing rod design.

The inner wrapping of fabric 6, preferably formed as a tape, is applied on the core 5 in overlapped convolutions that preferably provide a double layer of this fabric covering the core. This fabric may be rubber-impregnated or may comprise fiber glass fibers, the same being applied with such tautness as to intimately hug the core whether of flexible plastic or interiorly pressurized.

The wire wrapping 7 is preferably open-wound, as shown, so that the same strengthens the core and prevents its collapse under bending forces. Said wire, of suitable strong metal or plastic cord, is preferably steel and may be applied as a single wrap, plural wraps in the same direction of winding, alternately oppositely wound wrappings, or in basket-weave type of wrapping in which the successive windings are woven in and out of one another.

The outer wrapping 8 is then applied over the wire in the same way and of the same material as the inner wrapping 6.

Finally, the rod, as above, is coated with a suitable resin, of which the polyester and epoxy resins are exemplary, the same forming an impregnant premeating both wrappings and completely sealing the same when set under curing heat compatible with the resin used, i.e., in temperatures fifty or more degrees on either side of 150° C.

The resultant rod, while completely sealed by the impregnating resin, when flexed has the sheath formed by the wire warpping 7 not only strengthening and supporting the core against collapse, but capable of accommodating to the bend in the rod; i.e., the convolutions close up on the inner or concave side of the bend and open up on the outer or convex side. This "working" of the metal sheath is not of great magnitude, but acts to accommodate itself to the core movements.

The above-described rod may be modified by omitting the fabric windings 6 and applying the wire windings 7 directly on the core. Also, if both fabric windings 6 and 8 are used, the latter may comprise more turns to give a thicker wrapping than the former.

While the foregoing has illustrated and described what are now contemplated to be the best modes of carrying out the invention, the constructions are, of course, subject to modification without departing from the spirit and scope of the invention.

Having thus described the invention, what is claimed and desired to be secured by Letters Patent is:

1. A fishing rod comprising:
   (a) a hollow elastic core,
   (b) open-wound wire around said core,
   (c) a wrapping of porous fabric around said wire, and
   (d) a cured resin coating applied to the fabric wrapping, impregnating the same and sealing in the open-wound wire.

2. A fishing rod according to claim 1 in which fluid fills the hollow of the core, is sealed therein, and is under internal pressure.

3. A fishing rod according to claim 1 in which an intermediate wrapping of fabric is interposed between the core and the open-wound wire and is sealed in by the cured resin coating.

4. A fishing rod according to claim 3 in which fluid fills the hollow of the core, is sealed therein, and is under internal pressure.

5. A fishing rod according to claim 4 in which the core comprises an elastic bladder and the fluid comprises a gas.

6. A fishing rod according to claim 4 in which the open-wound wire comprises at least two wires with their convolutions wound in opposite directions.

7. A fishing rod according to claim 4 in which the open-wound wire comprises wires wound in basket-weave form with the successive windings woven in and out of one another.

8. A fishing rod according to claim 1 in which the fabric wrapping comprises a tape wound in overlapping convolutions and consisting of a porous material selected from the group of fiber glass and rubber-treated fabric.

References Cited

UNITED STATES PATENTS

| 692,884 | 2/1902 | Lyon | 43—18 |
| 785,845 | 3/1905 | Wheeler | 43—18 |
| 857,511 | 6/1907 | Audley | 43—18 X |
| 2,573,361 | 10/1951 | Rodgers et al. | 43—18 X |

WARNER H. CAMP, *Primary Examiner.*